April 7, 1970   D. GLASER   3,504,926
BABY CARRIAGE

Filed Oct. 15, 1968   3 Sheets-Sheet 1

INVENTOR.
DIETER GLÄSER

BY
Woodhams, Blanchard & Flynn
ATTORNEYS

April 7, 1970     D. GLASER     3,504,926
BABY CARRIAGE
Filed Oct. 15, 1968     3 Sheets-Sheet 2
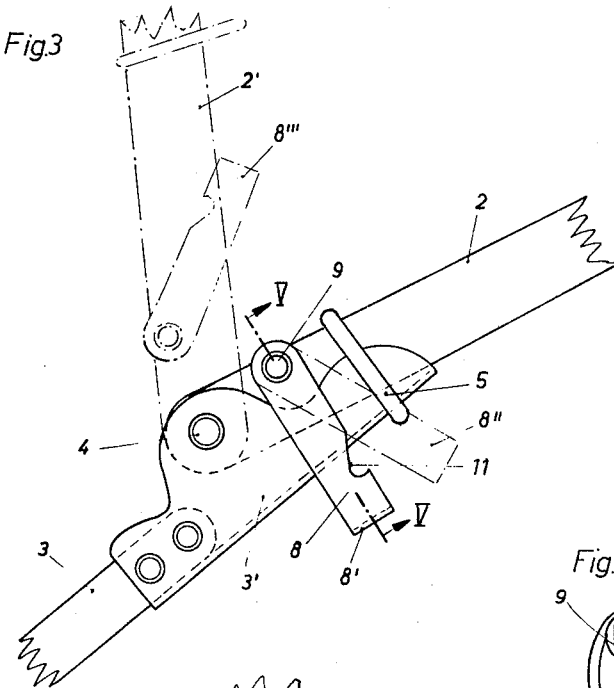
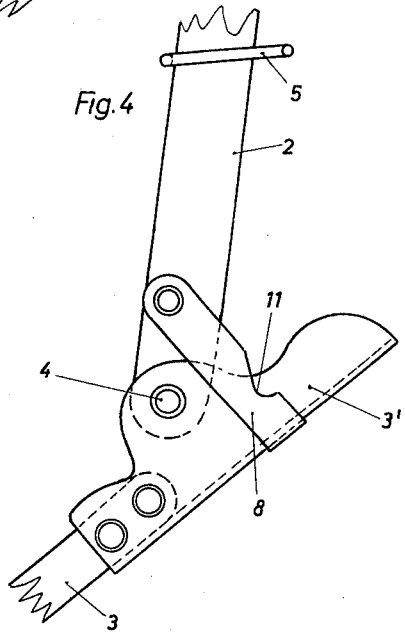
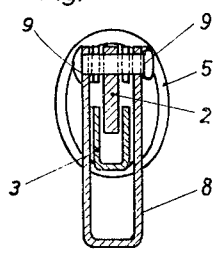
INVENTOR.
DIETER GLÄSER
ATTORNEYS April 7, 1970     D. GLASER     3,504,926
BABY CARRIAGE Filed Oct. 15, 1968     3 Sheets-Sheet 3

INVENTOR.
DIETER GLÄSER

BY Woodhams, Blanchard & Flynn
ATTORNEYS

United States Patent Office 3,504,926
Patented Apr. 7, 1970

3,504,926
BABY CARRIAGE
Dieter Glaser, Garching, near Munich, Germany, assignor to Peggy Munchener Kinderwagenfabrik G.m.b.H. & Co., KG, Munich, Germany
Filed Oct. 15, 1968, Ser. No. 767,785
Claims priority, application Germany, Oct. 19, 1967, 1,605,483
Int. Cl. B62b 7/08
U.S. Cl. 280—41      6 Claims

ABSTRACT OF THE DISCLOSURE

A baby carriage having a collapsible frame, a U-shaped handle having its two lower ends pivotably connected on both sides of the baby carriage to the upper end of the frame bars. A manually operable connecting and securing mechanism is provided adjacent the lower ends of the handle for releasably securing the handle relative to the frame in the upright position of use. An extension member is secured to one of the respective frame bars and the lower end of the handle and is releasably connectible to one of the handle and the frame bar. The extension projects past the pivotal connection of the handle to the frame bar. A bed or a seat insert is pivotably connected at one end to further frame bars and at the other end adjacent the two lower ends of the handle to the handle.

---

This invention relates to a collapsible baby carriage and, more particularly, relates to a device for preventing an accidental collapsing thereof and injuring the child occupant therein.

In the known collapsible baby carriages there exists the danger that when the baby carriage is in the upright position of use, a child lying on the bed or sitting in the seat insert can intentionally or accidentally release the connecting and securing mechanism which releasably secures the handle to the frame bars. After the release of the connecting and securing mechanism, the handle and the frame bars associated therewith no longer form a rigid support and are movable relative to each other due to the weight of the bed or seat and the child therein. The entire frame will then collapse and the bed or the seat insert will move downwardly with the resulting danger that the child in the baby carriage will be hurt. During the downward movement of the bed and the collapsing of the frame, the handle is moved from its upright position of use in direction toward and over the bed in an almost jerky-like manner. A child accidentally sitting or standing in the bed can thereby be hit by the handle and can be seriously hurt. A fatal accident has already happened in the described manner.

Thus, it is the basic purpose of this invention to construct a baby carriage of the above-discussed type which is of an accident-free construction and in which a particularly undesirable movement of the handle relative to the frame upon an accidental or intentional release of the manually operable connecting and securing mechanism between the handle and the frame rods is positively prevented with a simple and sturdy construction which can be manufactured economically.

To attain this purpose, the invention provides that a gripping device be provided on at least one of the lower ends of the handle or on the upper end of the frame bar associated therewith spaced from the pivot connection of the handle, which gripping device is manually movable into a gripping position wherein it couples the handle or the frame bar to an extension secured to the frame bar or the handle so that, if the connecting and securing mechanism is released, a relative pivoting movement will occur between the handle and the frame bar but the movement will be limited to a small angle of travel and is further manually movable into a release position in which, after the connecting and securing mechanism has been released, the handle is freely pivotable relative to the frame bars for the purpose of collapsing the frame.

The frame of the baby carriage of the invention does not completely collapse under the weight of a child sitting in the bed even if accidentally or intentionally the connecting or securing mechanisms between the handle and the frame bars are released. After the connecting and securing mechanisms are released, the handle collapses forwardly relative to the frame bars at a small angle in a direction toward the bed, but it is prevented from further movement by the gripping device which interconnects the handle to a frame bar and limits the amount of movement. The handle then remains in a slightly forwardly collapsed position. The movement of the handle forwardly in a direction toward the child in the bed, which movement can injure a child and is feared in known baby carriages, is therefore positively eliminated in the baby carriage embodying the invention. A collapsing of the frame is also prevented in this manner. The baby carriage embodying the invention is therefore accident free.

A very simple, sturdy and practically operable construction of the baby carriage embodying the invention is made possible by providing a gripping device which is constructed as a U-shaped shackle, the ends of which are pivotably connected to the handle (or the frame bar), and the end of the shackle which is spaced from the pivot connection of the shackle is spaced greater than the space of the free end of the extension of the frame bar (or the handle) from the pivot connection of the shackle in the upright position of use of the baby carriage so that the shackle is manually pivotable over the extension into a gripping position embracing the extension.

In a baby carriage in which rings are provided as the connecting and adjusting mechanisms, each one of the rings releasably embraces the handle adjacent the lower end thereof and when in the upright position of use of the handle is movable from above over the free end of the extension of the respective frame bar associated therewith so that a construction of the invention is achieved advantageously in such a way that the space between the legs of the U-shaped shackle which is used as a gripping device is less than the outer diameter of the respective ring. In this manner, it is assured that the shackle cannot be moved over the ring which couples the handle to the frame bar. Thus, the shackle can only be moved into its release position when the rings have already been moved upwardly into their release position. A child in the bed of the baby carriage can move the two rings which secure the handle on the frame bars in the upright position of use upwardly. However, the handle can only move a short distance. The shackle used as a gripping device comes to rest on the frame bar and thus prevents a further movement of the handle. The shackle is then strongly urged against the frame bar under the weight of the child in bed in such a manner that a manual movement of the shackle into its release position is not even possible for a person standing beside the baby carriage let alone for a child in the bed. Thus, the safety for the child is assured.

The baby carriage having the above-described construction is advantageously constructed further according to the invention in such a manner that the shackle has an indentation in the edges of each of its two legs facing the securing and connecting ring when the baby carriage is in the upright position of use. The ring is received into the indentation in its securing position which connects the handle and the extension of the frame bar during movement of the shackle in the direction toward the ring so that a further movement of the shackle and the ring is prevented. Thus, it is assured that if an intentional upward swinging movement of the shackle from its secured position occurs, the ring which connects the handle to the frame bar is not pushed upwardly along the frame bar and the handle by the shackle to thereby release the locking between handle and frame bar. By means of the indentations in the upper edges of the shackle, it is achieved that upon a pivoting of the shackle relative to the ring, the upper edges of the shackle hook into the ring so that the ring is received into the indentations. The shackle then locks the ring in its position on the handle and frame bar and thus prevents any further upward movement of the ring.

Further characteristics and advantages of the invention will be understood from the following description of two embodiments in connection with the drawings, in which:

FIGURE 3 is a side elevational view of the pivot point of the handle on a hinged bar of the baby carriage corresponding to the first embodiment with the handle illustrated in its position of use, that is, in locking engagement with the bar.

FIGURE 4 is a side elevational view of the pivot point according to FIGURE 3 with the handle pivoted upwardly with the gripping device in the gripping position.

FIGURE 5 is a sectional view taken along the line V—V of FIGURE 3.

Figure 1:
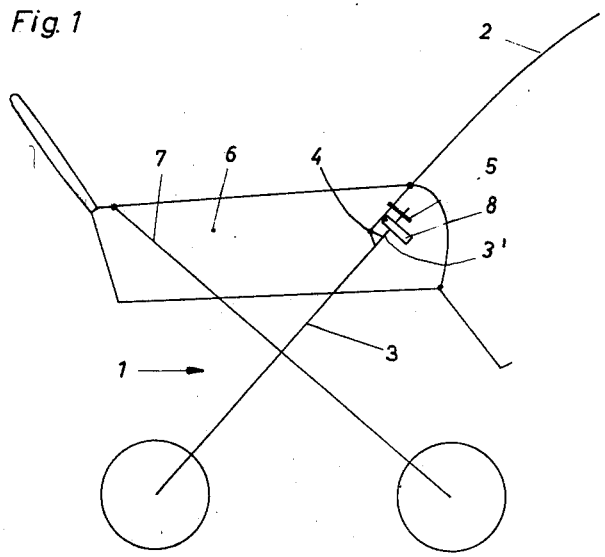
FIGURE 1 is a schematic side elevational view of a first embodiment of a baby carriage embodying the invention.

FIGURE 1 illustrates a baby carriage embodying the invention and comprises a collapsible frame generally identified with 1 which in the present case is illustrated as a simple X-type frame. A baby carriage embodying the invention can, however, also be made with other types of collapsible frame constructions. The baby carriage of this invention has a U-shaped handle 2 which is illustrated in a side elevational view as a single line in FIGURE 1. The handle 2 has two lower ends which are pivotably connected at both sides of the baby carriage to the upper ends of the frame bars 3 (only one frame bar 3 is shown in the drawings) each at a pivot point 4.

A manually operable connecting and adjusting mechanism for releasably securing the handle 2 relative to the frame bar 3 when in position of use is provided in the area of each lower end of the handle. The connecting and securing mechanism is constructed as a sliding ring 5 (FIGURES 1, 3–5) in the illustrated embodiment. An extension 3' is secured to the upper end of the frame bar 3 and projects past the pivot point 4 and is releasably engageable with the handle 2 by means of the connecting and adjusting mechanism 5. The handle 2 is pivotably secured to the extension 3' at the pivot point 4. The baby carriage according to FIGURE 1 is constructed as a stroller and shows a seat insert 6 which at one end is pivoted to a pair of further frame bars 7 and at the other end to the handle 2 adjacent the lower two ends thereof.

According to the invention, the baby carriage of FIGURE 1 has a gripping device 8 at at least one of the lower ends of the handle 2 but spaced from the pivot point 4 of the handle 2. The gripping device can be guided manually into a gripping position after the connecting and securing mechanisms are released in which it couples the handle to the extension 3' in such a manner that the relative pivoting therebetween about the pivot point 4 is limited to a small angle. The handle 2 can be further guided manually into a release position only after the connecting and securing mechanism has been released after which the handle 2 is freely pivotable relative to the frame bars 3 for the purpose of collapsing the frame.

FIGURES 3–5 illustrate in detail the construction of the pivoting of the handle 2 and of the connecting and securing mechanism 5 and of the gripping device 8 of the baby carriage according to the first embodiment illustrated in FIGURE 1. These figures show that a ring 5 defines the connecting and securing mechanism. In this embodiment, the ring releasably embraces the handle 2 adjacent the lower end thereof and, when the handle is in its position of use, is slideable from above over the free end of the extension 3'. The gripping device 8 according to the invention is constructed as a U-shaped shackle 8, the ends of which are pivotably connected as at 9 to the handle 2. The end 8' of the shackle is spaced from the pivot point 9 a distance greater than the space between the upper free end of the extension 3' of the frame bar 3 and the pivot point 9 when the baby carriage is in the upright position of use. The shackle 8 is therefore manually swingable over the extension 3' after the ring 5 has been pushed upwardly onto the handle 2 when the baby carriage is in position of use. As is illustrated in FIGURE 5, the space between the legs of the U-shaped shackle 8 is less than the outer diameter of the ring 5.

The baby carriage of the invention according to FIGURE 1 provides a gripping device in form of a shackle 8 only on one side of the bed 6. Thus, the safety of the child in the seat insert is assured. However, it is recognized that gripping devices can be placed on both lower ends of the handle on both sides of the baby carriage. Similarly, it is also recognized that rings 5 can be placed on both sides of the baby carriage.

FIGURE 3 illustrates in solid lines the upright position of use of the handle 2 and in which the handle is connected to the frame bar 3 to secure it against swinging by means of the ring 5. The shackle 8 is also illustrated in solid lines in the gripping position. The shackle 8 has an indentation 11 in the edges of both legs thereof facing the ring 5 when the baby carriage is in the upright position of use. The ring 5 will be received into the indentations when the ring is in the securing position to interconnect the handle 2 and the extension 3' of the frame bar 3 in case that the shackle 8 is moved accidentally or intensionally in the direction of the ring 5 into the position illustrated in dash-dotted lines in FIGURE 3. The ring 5 is then clamped between the indentation 11 and the extension 3' of the frame bar 3. A movement of the shackle 8 toward the upper end of the extension 3' to create an undesired releasing of the connection between handle 2 and frame bar 3 is prevented by its engagement with the ring 5. At the same time, the ring 5 will be maintained in position by its clamped engagement with the indentation in the shackle 8. A free movement of the handle 2 relative to the frame bars 3 is possible only if the ring 5 is first manually pushed upwardly over the end of the extension 3' of the frame bar 3 so that the shackle 8 can thereafter be moved manually over the end of the extension 3' into its release position which is indicated in dash-dotted lines in FIGURE 3 and identified with 8'''. Only then it will be possible to collapse the frame 1. FIGURE 3 illustrates in dash-dotted lines the free pivoting position of the handle 2 and identifies same with 2'.

FIGURE 4 illustrates the handle 2 in one position relative to the frame bar 3. In this position, the handle is prevented from further pivoting by the shackle 8 which is shown in the gripping position. FIGURE 4 clearly illustrates that a free pivotal movement of the handle 2 relative to the frame bar 3 is not possible when the shackle 8 is in the gripping position even if the ring 5 is moved upwardly over the extension 3' at the end of the frame bars 3. Therefore, even if a child sitting in the seat insert of the stroller of the invention of FIGURE 1 manually moves the ring 5 or the rings 5 on both sides of the stroller, if same are provided upwardly into the position illustrated in FIGURE 4, the frame 1 will not collapse and also the handle 2 will not move forwarly toward the child because the pivotal movement of the handle 2 is stopped by the shackle 8 after a very small angle of travel. Thus, the danger that a child in the stroller could be hit by the collapsing handle 2 is positively prevented.

Figure 2:
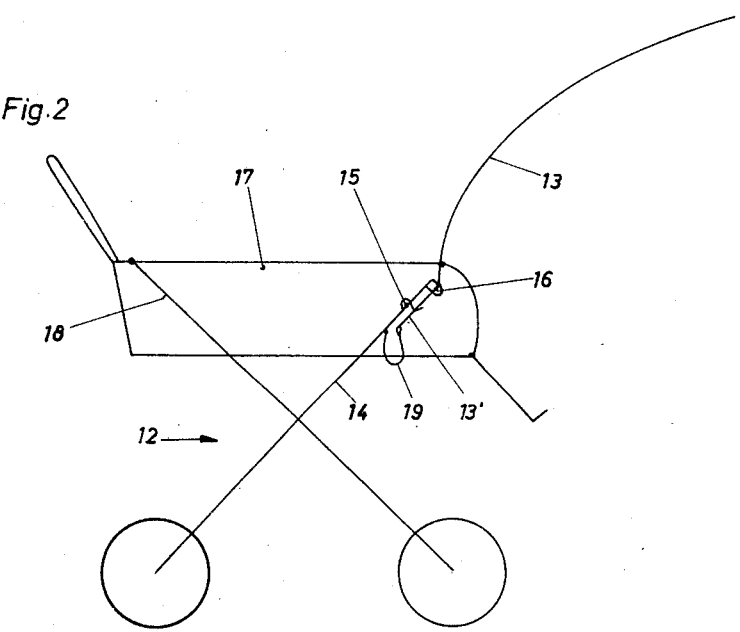
FIGURE 2 is a schematic side elevational view of a second embodiment of a baby carriage embodying the invention.
Figure 6:
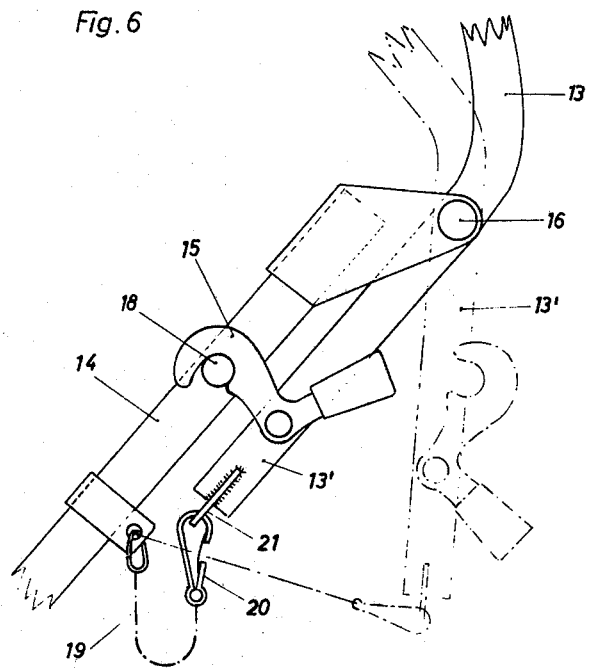
FIGURE 6 is a side elevational view of the pivot point of the pusher member on a frame bar of the baby carriage corresponding to the second embodiment.

FIGURES 2 and 6 illustrate a second embodiment of the baby carriage which is also constructed as a stroller. This stroller comprises also a simple X-shaped frame generally identified by 12. A U-shaped handle 13 has two lower ends pivotally connected to the upper end of a pair of frame bars 14, only one of which is shown in the drawings. The handle, adjacent the lower end thereof is provided with a manually operable connecting and securing mechanism for releasably securing the handle relative to the frame 12 in the upright position of use. The connecting and security mechanism is constructed as a manually operable pivotal hook member 15 in the embodiment illustrated in FIGURES 2 and 6. It is to be recognized that two such hook members 15 can be provided, one on each side of the carriage for securing the frame 12 in the upright position. However, since only one side of the carriage is shown in the drawings, only the structure surrounding one of the hook members 15 will be described in detail. An extension 13′ of the respective lower end of the handle 13 is releasably connectible to the frame bar 14 by means of each connecting and securing mechanism, each extension projecting past the pivot connection 16 of the handle 13 to the respective frame bar 14. The stroller, according to FIGURE 2, has a seat insert 17 which is pivotally connected at one end to further frame bars 18 and at the other end to the handle 13 adjacent the lower two ends of the handle.

A gripping device is provided on at least one lower end of the handle spaced from the pivot 16. The gripping device can be manually guided into a gripping position by which it prevents a movement of the handle 13 after the connecting and securing mechanism 15 has been released beyond a predetermined point and can thereafter be guided manually into a release position in which a free movement of the handle is permitted after release of the connecting and securing mechanism.

FIGURE 6 illustrates in detail the construction of each of the above-mentioned devices of the baby carriage of the invention according to FIGURE 2. A manually operable pivotal hook member 15 is hingedly connected to each lower end of the extension 13′ of the handle 13 which projects past the pivot point 16. The pivotal hook member 15 grips over a pin 18 secured to the respective frame bar 14 when the handle is in the upright position of use to thereby prevent a movement of same relative to the frame bars 14.

The gripping device in the stroller of FIGURE 2 is constructed as a flexible tensioning element 19, for example a short chain or cable. The tensioning element 19 is secured at one end to the frame bar 14 and is connected at the other end by a releasable fastening device to an eye 21 secured to the extension 13′ of the handle 13. In the particular embodiment shown, the releasable fastening device is a hook or a spring safety hook 20.

Even if the pivotal hook members 15 on both sides of the baby carriage are accidentally moved to their release position when the stroller is in an upright position of use according to FIGURE 2, so that the pivotal hook members no longer engage the pivots 18 and thus allow a movement of the handle 13 relative to the frame bars 14, the pivotal movement of the handle 13 is stopped after a short angle of movement by the flexible tensioning element 19 because said tensioning element becomes taut between the frame bars 14 and the ends of the handle. The handle 13 will then be in the position illustrated in dash-dotted lines in FIGURE 6 and is identified by 13″. The gripping device 19 prevents a movement of the handle after the release of the connecting and securing mechanisms past a predetermined point. In order to be able to freely swing the handle 13 for the purpose of collapsing the stroller, the spring safety hook 20 secured to one end of the tensioning element 19 is simply unhooked from the eye 21 on the extension 13′ of the handle 13.

The invention is not to be limited to the embodiments discussed above. For example, it is possible to construct the gripping device as a ring and locating same between the handle and the frame bar but swingably secured to the handle or the frame bar and the diameter, measured from the place of securement of the ring to the diametrically opposite side thereof, is greater than the space between the free end of the extension of the frame bar or the handle and the place of securement of the ring when the baby carriage is in the upright position of use. Furthermore, the baby carriage of the invention does not necessarily need to be constructed as a stroller with a seat insert but can also be constructed as a baby carriage having a bed therein. A baby carriage of the invention can also have a different type of supporting frame than the type illustrated. The gripping device of the invention can also be used for baby carriages in which the weight of the bed does not affect the movement of the handle. That is, the handle could collapse by means of an external force or by means of its own weight after an unlocking of the frame bars. Gripping devices can also be provided on both sides of the baby carriage of the invention. However, most times, a gripping device on one side is sufficient.

All characteristics disclosed in the description and the drawings including structural details can be important to the invention in any combinations.

The embodiments of the invention in which an exclusive property or privilege is claimed are defined as follows:

1. A baby carriage comprising a collapsible frame, a U-shaped handle which is pivotably connected on both sides of the baby carriage adjacent the lower ends thereof to the upper ends of a corresponding pair of frame bars, manually operable connecting and securing means provided adjacent the lower end of the handle for releasably securing said handle relative to said frame bars and in an upright position of use, an extension member secured to one of said handle and said frame bars, said extension member being releasably connectible to the other of said handle and said frame bars by means of said connecting and securing means, said extension member projecting past the pivotal connection of said handle to said frame bars, said baby carriage further comprising one of a bed and a seat insert hingedly connected at one end to further frame bars and at the other end to one of said handle and said frame bars, the improvement comprising a gripping device spaced from said pivotal connection and pivotably secured to one of the lower end of said handle and at the upper end of said frame bars, which gripping device is manually pivotable into a gripping position wherein it couples one of said handle and said frame bars with said extension, whereby if said connecting and securing means are released, a relative pivoting movement will occur between said handle and said frame bars, said pivoting movement being limited to a small angle of travel by said gripping device and is manually pivotable into a release position whereby, after the connecting and securing means is released, the handle is freely pivotable relative to the frame bars for the purpose of collapsing the frame.

2. A baby carriage according to claim 1, in which the gripping device is constructed as a U-shaped shackle, having a pair of legs, the ends of which are pivotably connected to one of said handle and said frame bars and the end of said shackle which is spaced from the pivot connection thereof is greater than the space between the free end of the extension on one of said handle and said frame bars and the pivot connection of the shackle when said baby carriage is in said position of use so that said shackle can be manually pivoted over the extension.

3. A baby carriage according to claim 2, in which said connecting and securing means is a ring which embraces the handle adjacent the lower end thereof when said handle is in the upright position of use and is movable from above over the free end of the extension of the respective frame bar associated therewith and in which the space between the legs of the U-shaped shackle is less than the diameter of the ring.

4. A baby carriage according to claim 3, in which the shackle has an indentation in the edges thereof facing the securing and connecting ring when the baby carriage is in the upright position of use, said indentation receiving the ring when said ring is in its securing position connecting the handle and the extension of the frame bar during movement of the shackle in a direction toward the ring so that a further pivoting of the shackle and a further movement of the ring is prevented.

5. A baby carriage according to claim 1, in which the gripping device includes a short flexible tensioning element releasably secured between the handle and the frame bar by means of a releasable securing mechanism.

6. A baby carriage according to claim 1, in which the gripping device is constructed as a ring which is pivotably secured to one of the handle and at least one of the frame bars and has a diameter, measured from the pivot point of the ring to the diametrically opposite side thereof greater than the space between one of the free ends of the extension of the frame bar and the handle and the pivot point when the baby carriage is in the upright position of use.

References Cited

UNITED STATES PATENTS

| 2,467,579 | 4/1949 | Boudreau | 287—99 |
| 3,029,087 | 4/1962 | Alsop | 280—47.37 |
| 3,330,575 | 7/1967 | Boudreau | 280—36 |

FOREIGN PATENTS

| 729,347 | 5/1955 | Great Britain. |

BENJAMIN HERSCH, Primary Examiner

ROBERT R. SONG, Assistant Examiner